(No Model.)
M. M. HOLMES.
LISTER CORN PLANTER.
No. 337,156. Patented Mar. 2, 1886.
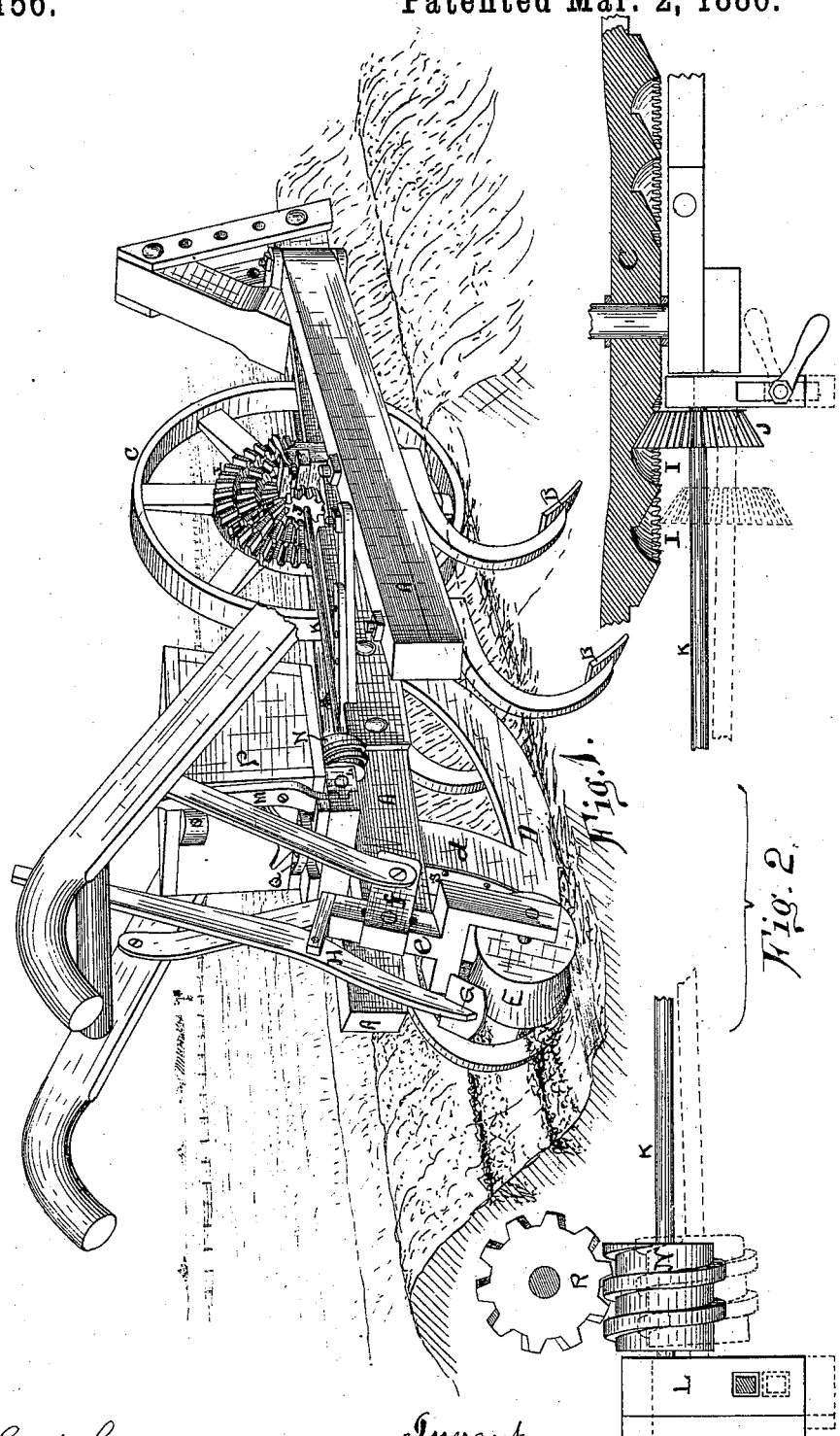
Witnesses
N. B. Smith
R. W. Smith
Inventor
M. M. Holmes
By his Atty R. D. O. Smith

UNITED STATES PATENT OFFICE.

MOSES M. HOLMES, OF GOWER, MISSOURI.

LISTER CORN-PLANTER.

SPECIFICATION forming part of Letters Patent No. 337,156, dated March 2, 1886.

Application filed September 12, 1885. Serial No. 176,968. (No model.)

*To all whom it may concern:*

Be it known that I, MOSES M. HOLMES, of Gower, Buchanan county, in the State of Missouri, have invented a new and useful improvement in the cultivator for which Letters Patent No. 308,671 were granted to me December 2, 1884; and I do hereby declare that the following is a full and accurate description of the same.

This improvement consists in adapting the lister which was the subject of the patent above mentioned to the planting of corn in the bottom of a trench, and the particular improvement will be fully understood from the following description, having reference to the accompanying drawings, wherein—

Figure 1 is a perspective view of my machine in operative position. Fig. 2 is a sectional plan showing the shifting-gear.

That the invention may be fully understood, I will describe the mode of planting and cultivating corn in some portions of the West where summer drouths prevail. This is to a large extent the case in Kansas. Generally in the corn-growing portions of the United States the seed is planted near the surface of the ground, and the roots do not penetrate far below the surface. Consequently the plants are quickly affected by drouth. In regions west of the Missouri river summer drouths are common, and to avoid their effect corn is planted in trenches, which in the course of cultivation become filled and leveled, and the roots of the plants buried from twelve to eighteen inches below the surface. Penetrating so far below the surface, they are not affected by drouth so soon as plants standing with their roots near to the surface, as does corn in the eastern sections of the country. The corn-trenches being made with the plow, the machine above named, on which this is an improvement, is employed to cultivate the sides of said trenches, gradually moving the soil downward around the growing plants.

My present improvement consists in adapting said machine to use as a planter of corn in the bottom of the trenches above mentioned.

A is the frame of the machine, which is the same frame used for after cultivation in the trench, as described in my said patent. The long sharp-edged blades therein described are replaced with the shovels B, which break up and disturb the soil in the bottom of the trench, throwing it into a slight ridge along the bottom of the trench, as shown. Near the front end of the frame A there is a traction-wheel, C, to drive the feed devices. This wheel runs in the bottom of the trench in advance of the ridge thrown up by the shovels B. In rear of the wheels C there is an ordinary corn-planter runner, D, which opens the slight trench, into which the seed is dropped. The rear upright, *d*, of the runner is tubular, and conducts the grains of seed down into the trench immediately at the heel of said runner. Immediately behind the runner is an adjustable covering and pressing roller, E, mounted on a standard, *e*, adjustable up or down in a clip, *f*, at the rear end of the middle bar of the frame A. The adjustment of the roller E determines the depth to which the runner will penetrate, and also to some extent the pressure upon the soil covering the planted seed. A scraper, G, is mounted on one end of a lever, H, pivoted to the standard *e*, and arranged to be swung into contact with the roller E to scrape adhering soil from the same whenever it requires to be cleaned. The wheel C has on its side two or more concentric cog-rings, I I, all adapted to mesh with a pinion, J, on a shaft, K, which lies parallel with the plane of the wheel C, and turns in bearings on the frame. Said pinion may be moved on said counter-shaft, so as to mesh with either of said cog-rings, and the relative speed of wheel C and shaft K may be varied accordingly. At its rear end said shaft turns in a clip-box, L, which is controlled by a hand-lever, M. Near its rear end said shaft is provided with a worm-wheel, N, which meshes with a pinion, R, on the axle of the feed-cup disk Q to turn the same. The feed-cup disk Q is located in and constitutes the bottom of the seed-hopper P. It has a series of cells near its periphery, into which the seeds drop, and then are carried around therein until they pass over the upper end of the grain-tube S in the rear member of the runner, where they drop out and through said tube into the trench at the heel of said runner. A stiff brush, within the hopper and immediately above the line of cells as they pass out, brushes off the surplus grain, so that the cell does not carry out more seed than it can convey without crushing any against the edge of the hopper. The lever M causes the worm-wheel N to engage or disengage the pinion P, according to the direction in which it is moved, and thus causes the feed-disk Q to start or stop without stopping the progress of the machine.

Having described my invention, I claim as new—

1. A lister corn-planter consisting of a frame, A, provided with the shovels B, adapted to plow in the bottom of a trench and throw the soil toward the center, making a slight ridge therein, combined with a runner, D, seed-hopper R, feed device to deliver definite quantities of seed, traction-wheel C, in front of the runner, and covering-roller E, behind the same, whereby the seed mechanism is driven and the machine is supported, as set forth.

2. A lister corn-planter consisting of a frame, A, provided with shovels B, adapted to plow in the bottom of a trench and throw the soil toward the center, making a slight ridge of loose earth therein, combined with a runner, D, seed-hopper R, and the vertically-adjustable covering-roller E, to regulate the depth of penetration of the shovels and runner and cover the seed, as set forth.

3. The covering-roller E, attached to the standard e, adjustable up or down in a clip, f, combined with a scraper, G, mounted on one end of a lever, H, also pivoted to said standard, so as to be adjustable with said roller to clean said roller of adhering soil at will, as set forth.

MOSES M. HOLMES.

Witnesses:
DAVID S. HALL,
N. B. SMITH.